Patented Oct. 13, 1936

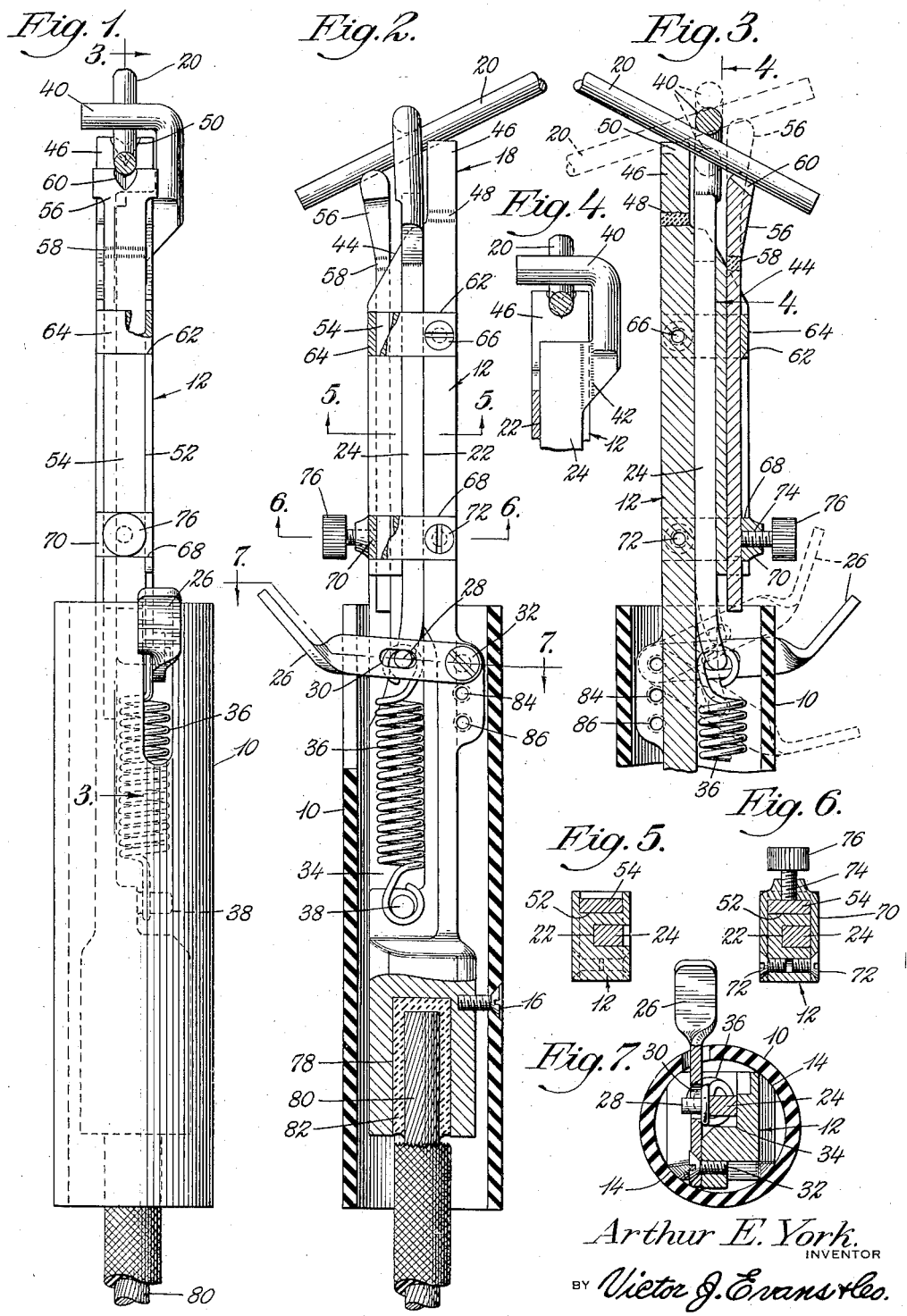

2,057,320

UNITED STATES PATENT OFFICE 2,057,320

ELECTRIC WELDING TOOL

Arthur E. York, Chicago, Ill.

Application April 10, 1935, Serial No. 15,673

8 Claims. (Cl. 219—8)

My invention relates to welding, and has among its objects and advantages the provision of an improved electric welding tool.

In the accompanying drawing:

Fig. 1 is a top plan view of the tool;

Fig. 2 is a side elevation partly in section;

Fig. 3 is a sectional view along the line 3—3 of Fig. 1;

Fig. 4 is a sectional view along the line 4—4 of Fig. 3;

Fig. 5 is a sectional view along the line 5—5 of Fig. 2;

Fig. 6 is a sectional view along the line 6—6 of Fig. 2; and

Fig. 7 is a sectional view along the line 7—7 of Fig. 2.

In the embodiment selected to illustrate my invention, I make use of a grip 10 of insulating material operatively connected with a shank 12. This shank is generally rectangular in cross section (see Fig. 7) with its corners cut away as at 14 to conform to the curvature of the grip 10. The surfaces 14 fit snugly within the grip and the two parts are detachably connected together through the medium of a screw 16. The shank 12 terminates in a head 18 for holding a welding bar 20.

In detail, the shank 12 is provided with a groove 22 for the reception of a bar 24. This bar is slidably mounted within the groove and has one end connected with a lever 26 through the medium of a pin 28 extending through the slot 30 in the lever. The latter is pivotally connected with the shank 12 at 32. I cut away a part of the shank at 34 to provide a recess for housing a spring 36 having one end connected with the pin 28 and its opposite end connected with a pin 38 carried by the shank. The spring 36 is under tension and tends to pull the bar 24 inwardly.

At the opposite end of the bar 24 I weld a hook 40 of nichrome. The line of weld is indicated at 42. I taper the shank 12 at 44 and weld an extension 46 of nichrome to the shank. I indicate the line of weld at 48. In Fig. 1, the extension 46 is provided with a V-shaped groove 50 for the reception of the rod 20. One side of the shank 12 is grooved at 52 for the reception of a bar 54 having an abutment 56 of nichrome welded thereto at 58. This abutment is provided with a V-shaped groove 60 co-operating with the groove 50 for firmly supporting the welding bar 20 through the medium of the hook 40.

Three sides of the shank 12 are provided with communicating grooves 62 for the reception of a clip 64 which embraces the bars 24 and 58 for holding the bars within their respective grooves. The clip 64 is U-shaped in configuration and is made secure by screws 66 having threaded relation with threaded openings in the shank 12. The second groove 68 is provided in the same three sides of the shank 12 for the reception of a second clip 70 having its ends secured in place by screws 72. A threaded opening 74 extends through the bight of the clip for the reception of a set screw 76 which bears against the bar 54 for securing the bar in various adjusted positions. Shifting of the bar changes the relative positions of the extension 46 and the abutment 56. In operation, it may be desirable to support the welding bar 20 at various angular positions with respect to the longitudinal axis of the tool. Such adjustment may be easily and quickly attained through the medium of the set screw 76.

Referring to Fig. 2, I provide a bore 78 in the end of the shank 12 for the reception of a cable 80, which cable is firmly secured in place through the medium of solder 82. Thus, the cable is electrically connected with the shank 12. Similarly, the bar 20 is arranged in electrical contact with the shank. In use, the circuit through the tool and bar 20 is closed when bringing the bar into contact with the work. The rod may be released by merely pressing forwardly on the lever 26.

Under operating conditions, shifting of the rod 20, which is defined in the art as an electrode, frequently creates an electric arc. The commercial electrode is provided with a coating of flux in the nature of insulation. This insulation extends substantially throughout the entire length of the electrode with the exception of a short reach at one end for the purpose of connection with holding devices. At times it is desirable and frequently necessary to establish a connection inwardly of the bared end, which necessitates removal of the flux for the purpose of establishing the necessary electrical connection. Such removal may be made by clamping the rod at a predetermined position and tapping one end of the rod while in clamped relation with its holder, whereby the parts contacting the rod will remove the necessary flux. Frequently arcs are created at the point of removal. My nichrome parts 40, 46, and 56 have high heat resisting properties which prevent damage thereto because of any flashing which might occur.

I illustrate the shank as being provided with two openings 84 and 86 for the reception of the screw 32, whereby the position of the lever 26 may be changed. These openings permit the bar 24 to be changed as to its operating relation with the shank for adjusting the hook 40 to the fixed abutment 46 which tends to shorten slightly over a long period of use because of the extreme temperature conditions under which it is necessary to subject the tool.

The spring 36 is housed within the grip 10 and at a point remote from the head 18 so as to be protected from the high temperature of the head. In addition, the grip 10 is so designed with respect to the shank 12 as to permit circulation of air through the grip, which tends to maintain an extremely low temperature.

The shank embodies a smooth configuration because of the imbedding of the clips 64 and 70. Thus, the tool is devoid of abutments which might strike objects, such as the welding table or any grounded surface, and create an arc. Furthermore, the housing of the bars 24 and 54 and the clips 64 and 70 within the contour of the shank provides a compact arrangement, and one in which maximum visibility is attained.

Without further elaboration, the foregoing will so fully explain my invention that others may, by applying current knowledge, readily adapt the same for use under various conditions of service.

I claim:

1. An electric welding tool comprising an insulated grip, a rod holding head connected with the grip, said rod holding head comprising two normally fixed abutments, one of said abutments being adjustable with respect to the other, and a movable abutment cooperating with said first-named abutments for clamping relation with a rod, said welding head being of electrically conducting material.

2. An electric welding tool comprising a grip, a shank carried thereby, said shank having a pair of grooves, one end of the shank comprising an abutment, a bar positioned within each of the grooves, means for fixedly connecting one of the bars with the shank, the other bar being movably mounted within its respective groove, and means for shifting the said other of said bars, the said other of said bars having a hook co-operating with the other bar and said abutment for clamping a welding rod.

3. An electric welding tool comprising a grip, a shank carried by said grip, said shank having a pair of grooves, a bar positioned within each groove, one end of said shank comprising an abutment, one of said bars having an end comprising an abutment, the other of said bars having a hook co-operating with said two abutments for clamping relation with a welding rod, said bars being housed within the cross sectional contour of the shank, and means lying within the contour of the shank and embracing the bars for holding the latter within the grooves.

4. An electric welding tool comprising a grip, a shank carried by said grip, said shank having a pair of grooves, a bar positioned within each groove, one end of said shank comprising an abutment, one of said bars having an end comprising an abutment, the other of said bars having a hook co-operating with said two abutments for clamping relation with a welding rod, said bars being housed within the cross sectional contour of the shank, means lying within the contour of the shank and embracing the bars for holding the latter within the grooves, means associated with said means for fixedly securing one of the bars in various adjusted positions, the other of said bars being movable, and means for actuating the movable bar.

5. In an electric welding tool, a fixed grooved abutment, a second grooved abutment associated therewith and being adjustable relatively to the fixed abutment, and a hook movably associated with the fixed abutment and co-operating with the two abutments for clamping a welding rod.

6. In a welding tool, a shank, a nichrome abutment carried by said shank, a second nichrome abutment movably connected with the shank, both abutments having co-operating grooves for receiving a welding rod, and a hook member movably connected with the shank, the hook part comprising nichrome, said hook part being arranged in operative relation with the abutments for clamping the welding rod.

7. A welding tool comprising an insulated grip, a shank connected with the grip, said shank having one end constituting a grooved abutment, said shank having grooves, a bar positioned in one of said grooves and having a grooved abutment, means for adjustably fastening said bar in various shifted positions, a movable bar positioned within the other of said longitudinal grooves, said movable bar having a hook extending beyond the two grooved abutments for pulling a welding rod into the said grooves and clamping the same in fixed relation with the abutments, a lever pivotally connected with the shank and said movable bar, and resilient means operatively connected with said movable bar and the shank for holding the hook of the bar in clamping relation with the welding rod, said shank being of electrically conducting material.

8. A welding tool comprising an insulated tubular grip, a shank having one end positioned inside the grip and fixedly connected with the latter, said shank having one end extending beyond said grip and constituting a grooved abutment, said shank having longitudinal grooves, a bar positioned in one of said grooves and having a grooved abutment, means for adjustably fastening said bar in various shifted positions, a movable bar positioned within the other of said longitudinal grooves, said movable bar having a hook extending beyond the two grooved abutments for pulling a welding rod into the said grooves and clamping the same in fixed relation with the abutments, a lever pivotally connected with the shank and said movable bar, and spring means operatively connected with said movable bar and the shank for holding the hook of the bar in clamping relation with the welding rod, said shank and said bars being of electrically conducting material.

ARTHUR E. YORK.